United States Patent [19]

Mascia et al.

[11] 4,165,025

[45] Aug. 21, 1979

[54] PROPELLANTLESS AEROSOL WITH FLUID PRESSURE GENERATING PUMP

[75] Inventors: Carmen T. Mascia, Clarendon Hills; Gary K. Hawegawa, Chicago, both of Ill.

[73] Assignee: The Continental Group, Inc., New York, N.Y.

[21] Appl. No.: 835,347

[22] Filed: Sep. 21, 1977

[51] Int. Cl.² ............................................. B65D 83/14
[52] U.S. Cl. .................................................. 222/401
[58] Field of Search ............... 222/373, 394, 383, 401, 222/402, 321

[56] References Cited

U.S. PATENT DOCUMENTS

| | | | |
|---|---|---|---|
| 984,619 | 2/1911 | Truesdale et al. | 222/401 |
| 1,191,737 | 7/1916 | Rousseau | 222/402 X |
| 2,748,985 | 6/1956 | Seymour | 222/402.24 X |
| 3,471,065 | 10/1969 | Malone | 222/321 |

FOREIGN PATENT DOCUMENTS 725121  5/1932  France ..................... 222/401

Primary Examiner—David A. Scherbel
Attorney, Agent, or Firm—Charles E. Brown

[57] ABSTRACT

A dispensing type container wherein a fluid product is dispensed under pressure from the container in the absence of special charging gases such as Freon and the like which are customarily utilized and which have been found to be objectionable. The container is charged with air under pressure from the atmosphere and includes a built-in cylinder which is associated with a separately formed and mounted piston. When the container is to be charged for dispensing the product, it is merely placed on the piston and reciprocated several times to pump air thereinto under pressure. The piston is reusable.

2 Claims, 3 Drawing Figures

U.S. Patent  Aug. 21, 1979  4,165,025
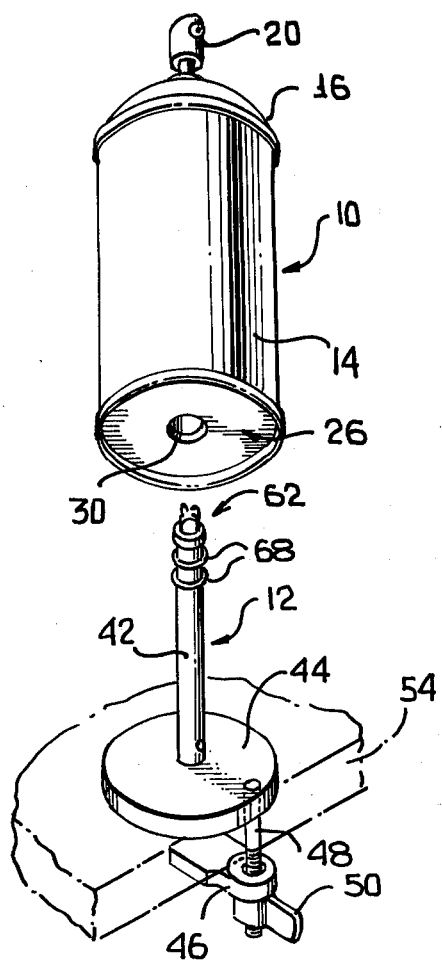
FIG.1
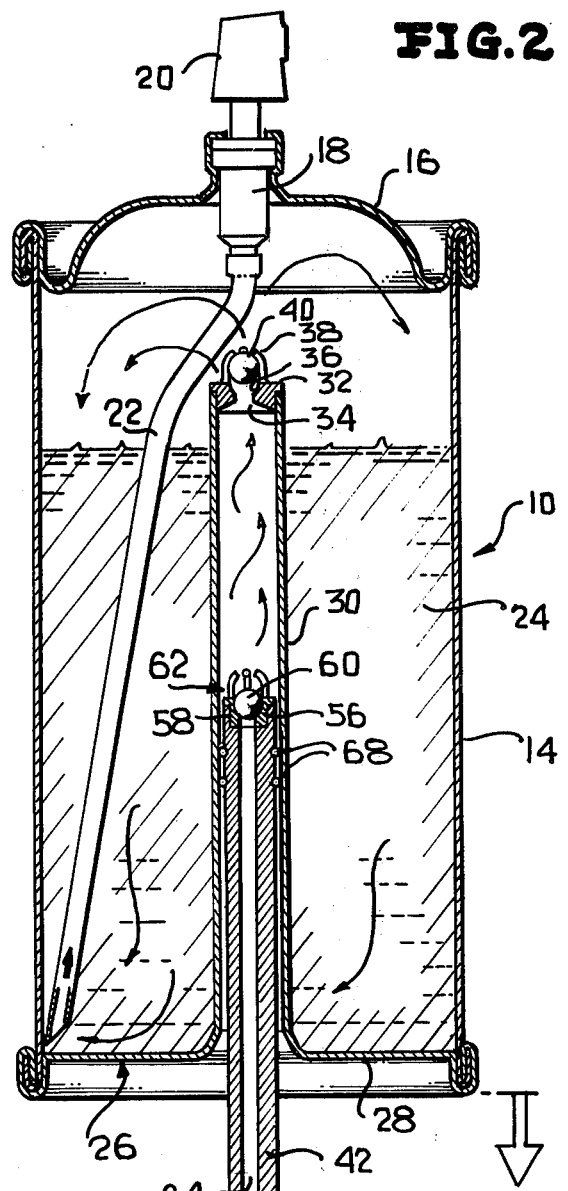
FIG.2
FIG.3
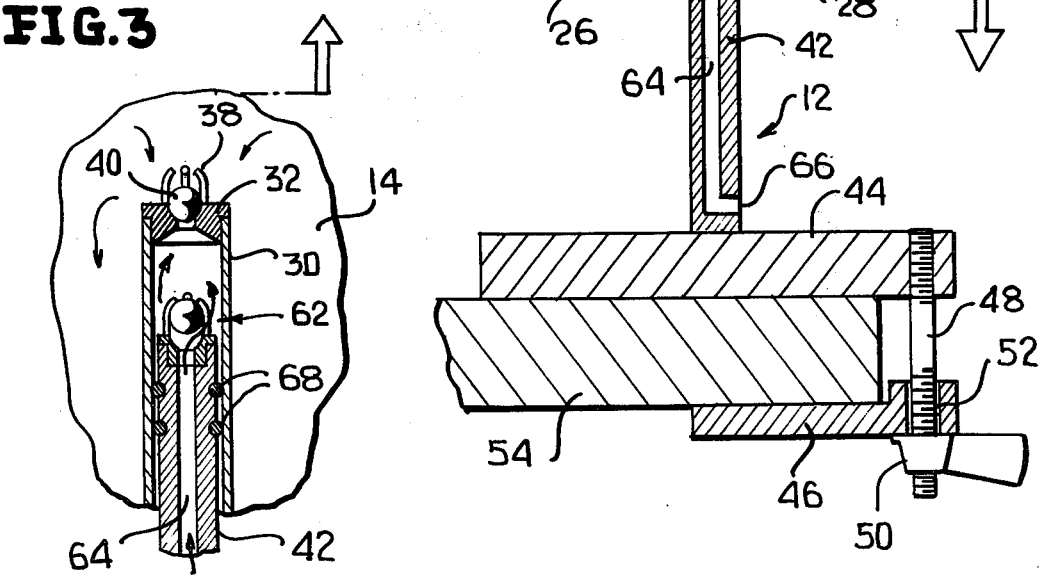

PROPELLANTLESS AEROSOL WITH FLUID PRESSURE GENERATING PUMP

This invention relates in general to new and useful improvements in containers for dispensing a product under pressure, and more particularly to a container which may be selectively pressurized by the utilization of atmospheric air.

In the past and still in the present there are available containers of the aerosol type wherein the containers are precharged by the use of certain gases, including Freon and the like. While these gases do not pose problems with the products being dispensed, they have been found to be objectionable because of their undesirable influence on the ecology.

In accordance with this invention, it is proposed to provide a container which will deliver a fluid under pressure in the usual manner of an aerosol can, but wherein the container is not precharged but is provided with suitable pump means permitting the ready and rapid internal pressurization thereof.

Most specifically, in accordance with this invention there is provided a conventional aerosol type container wherein the bottom wall thereof is provided with an elongated tube extending into the container and opening through the bottom wall to the atmosphere. This tube forms a cylinder. Separately formed from the container is a piston in the form of an elongated rod. It is intended that the piston be reusable and means are provided for conveniently mounting the piston. When it is desired to pressurize a container or increase the pressure therein, the cylinder of the container is merely telescoped onto the piston and the container reciprocated several times on the piston in a conventional pumping action.

A principal feature of the invention is that the cylinder arrangement may be formed in a very economical manner so as to be commercially feasible.

With the above and other objects in view that will hereinafter appear, the nature of the invention will be more clearly understood by reference to the following detailed description, the appended claims, and the several views illustrated in the accompanying drawing.

IN THE DRAWING

FIG. 1 is an exploded perspective view of the container and separately formed piston with the container in position to be placed onto the piston.

FIG. 2 is an enlarged vertical sectional view taken through the center of the container and shows the same mounted on the piston for effecting pumping of air into the container.

FIG. 3 is an enlarged fragmentary vertical sectional view primarily through the cylinder and piston and shows the piston valve open for entry of air into the cylinder during the return stroke of the container.

Referring now to the drawing in detail, reference is first made to FIG. 1 wherein there is illustrated a container formed in accordance with this invention, the container being generally identified by the numeral 10. There is also illustrated mounted for cooperation with the container 10 a piston unit 12.

Referring now to FIG. 2 wherein the construction of the container 10 and the piston unit 12 is more specifically illustrated, it will be seen that the container 10 is generally of the same construction as a conventional aerosol can, but with an addition. The container 10 includes a can body 14 having the upper end thereof closed by an end unit 16 of the breast type. The end unit 16 is provided with the usual aerosol valve 18 and has projecting from the valve 18 the customary actuator and spray head 20. Inasmuch as the end unit 16, the valve 18 and the spray head are conventional, no further description of these components is believed to be necessary. It is, however, pointed out at this time that the valve 18 has coupled to the lower end thereof a spray tube 22 which extends down into the container 10 for receiving a fluid or liquid product 24 packaged within the container 10.

The container 10 differs from conventional aerosol type containers in the construction of the bottom end unit which is generally identified by the numeral 26. The end unit 26 includes an end panel 28 which has extending therefrom an elongated small diameter tube 30. The tube 30 opens outwardly through the end panel 28 and projects into the interior of the container 10 a considerable distance, approaching the valve 18. The inner end of the tube 30 is provided with a fitting 32 which defines an outlet orifice 34 and a valve seat 36. The fitting 32 also includes fingers 38 which function as a cage for a ball valve element 40. The valve element 40 is cooperable with the valve seat 36 to close the valve outlet orifice 34 only against the return flow through the outlet orifice.

Reference is now made to the separately formed piston unit 12 which includes an elongated piston 42 in the form of a rod. The piston 42 is suitably secured to a base 44 for supporting the same. If desired, the base 44 may have associated therewith a clamp arrangement 46 which is carried by a threaded rod 48. The rod 48 has one end threaded into the base and on the other end thereof is a threaded member 50. The rod 48 freely passes through an opening 52 in the clamp member 46. It will be readily apparent that the clamp member 46, in cooperation with the base 44, may be utilized to mount the piston unit 12 on a suitable support 54 which may be part of a counter top, etc.

The piston 42 is provided at the upper end with a recess 56 in which there is seated a fitting 58. The fitting 58 is of a construction similar to the fitting 32 and together with a ball valve element 60 defines a one-way ball valve type structure 62. The piston 42 has a supply passage 64 which extends substantially the full length thereof from the recess 56 to an inlet opening 66 disposed adjacent the base 44.

In order to provide a seal between the piston 42 and the cylinder 30, the piston 42 is provided adjacent the upper end thereof with two annular grooves which carry O-rings 68.

It is to be understood that in order to utilize the container 10, one purchases or is supplied with a piston unit 12. Then when one desires to discharge a product from a container of the construction of the container 10, one merely telescopes the container 10 over the piston 42 and vertically reciprocates the container. When the container is moved downwardly, air trapped above the piston 42 is pumped out of the upper end of the cylinder 30 into the upper portion of the container 10. Then when the container 10 is moved upwardly relative to the piston 42, the valve of the cylinder 30 closes and the valve 62 opens, as is shown in FIG. 3 so that air enters into the cylinder 30 above the piston 42 through the supply passage 64. Thus repeated reciprocation of the cylinder 10 relative to the piston 42 will result in the internal charging of the container 10 with air from the atmosphere.

Inasmuch as the container 10 is charged with atmospheric air, it will be readily apparent that except for the product 24 carried thereby, no problem of damage to the ecology is involved. On the other hand, it will be seen that the product 24 may be dispensed in the same conventional manner as with existing aerosol containers.

While the cost of the end unit 26 is obviously slightly greater than that of a conventional end unit having a generally planar end panel 28 is less than that of the end unit 26, in view of the saving of Freon and the necessity of the packager charging the container, it will be seen that the overall cost of the container 10 will be approximately the same as that of the conventional aerosol container.

It will also be apparent that the container 10 poses no disposal problems in that except for the product 24 packaged therein there is no explosion problem of fires.

Although only a preferred embodiment of the container has been specifically illustrated and described herein, it is to be understood that minor variations may be made in the container and pump unit without departing from the spirit and scope of the invention as defined by the appended claims.

What is claimed as new is:

1. A product dispensing assembly comprising a container and a separately formed pump piston, support means connected to said pump piston for fixedly mounting said pump piston to a supporting object entirely independently of said container, said container being in the form of a can including a body having a top closure wall and carrying a dispensing valve, said can further including a separately formed bottom end unit secured to said body by a peripheral seam and including an end panel having an inlet opening therethrough, a cylinder of a size for cooperation with said independently fixed mounted pump piston, said cylinder being disposed internally of said can and being secured to said end panel surrounding said inlet opening, said support means including a base plate, and clamp means carried by said base plate for clamping said base plate to a support structure, said pump piston being fixedly secured to said base plate.

2. The assembly of claim 1 wherein said pump piston is in the form of a constant diameter tubular rod of a size for cooperation with said cylinder, said tubular rod having an inlet opening adjacent said base plate and a discharge opening at the end thereof remote from said base plate, and external sealing means on said tubular rod adjacent said discharge opening for sliding sealing engagement with said cylinder.

* * * * *